United States Patent

[11] 3,575,253

| | | |
|---|---|---|
| [72] | Inventor | Karl Brumm |
| | | Hessen, Germany |
| [21] | Appl. No. | 851,821 |
| [22] | Filed | Aug. 21, 1969 |
| [45] | Patented | Apr. 20, 1971 |
| [73] | Assignee | General Motors Corporation |
| | | Detroit, Mich. |
| [32] | Priority | Mar. 1, 1967 |
| [33] | | Germany |
| [31] | | 12333 |
| | | Continuation of application Ser. No. 708,192, Feb. 26, 1968, now abandoned. |

[54] REAR AXLE ARRANGEMENT FOR MOTOR VEHICLES
5 Claims, 5 Drawing Figs.

[52] U.S. Cl. ................................................. 180/71, 280/124
[51] Int. Cl. .................................................... B60g 9/00
[50] Field of Search .......................................... 180/71, 73; 280/124

[56] References Cited
UNITED STATES PATENTS
2,669,315  2/1954  Butterfield ................... 180/71
FOREIGN PATENTS
1,194,866  5/1959  France ......................... 180/73

*Primary Examiner*—A. Harry Levy
*Attorneys*—W. E. Finken and D. L. Ellis

ABSTRACT: A rigid driven rear axle is connected adjacent each end to the vehicle body by a single longitudinal link and by a spring strut consisting of a helical spring and a telescopic shock absorber. The spring strut is pivotally mounted at one end to the vehicle body and is hingedly connected at its other end to the rear axle by a rigid hinge connection having a pivot axis which is transverse to the axle and is located at or below the level of the axle, the hinge connection thus being such as to permit pivoting of the strut in transverse planes of the vehicle but to form a rigid connection in the longitudinal direction of the vehicle.

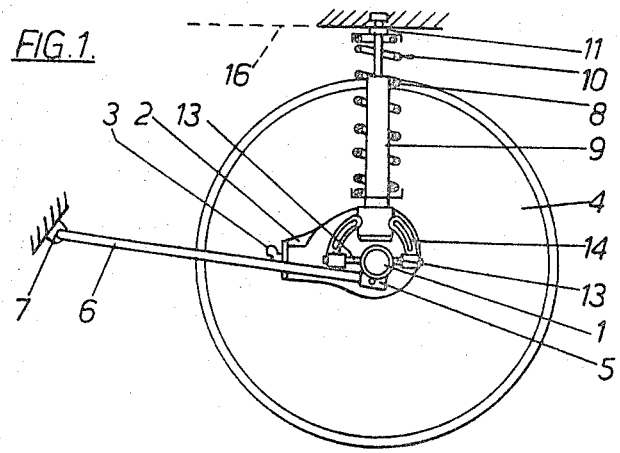
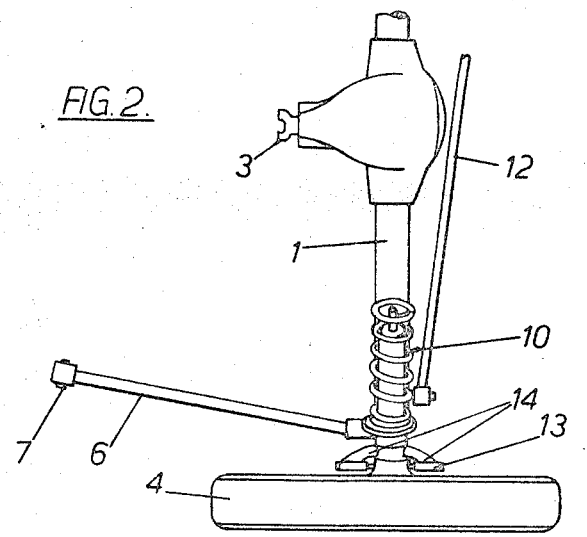
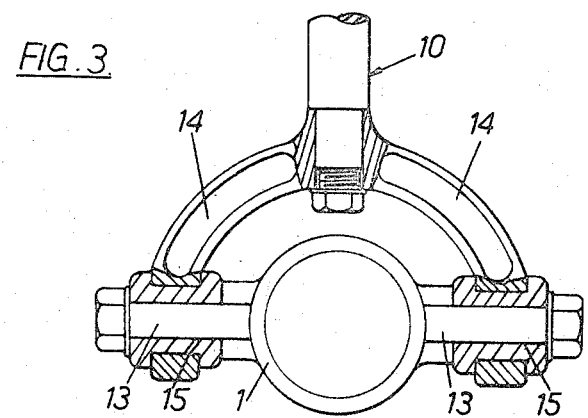

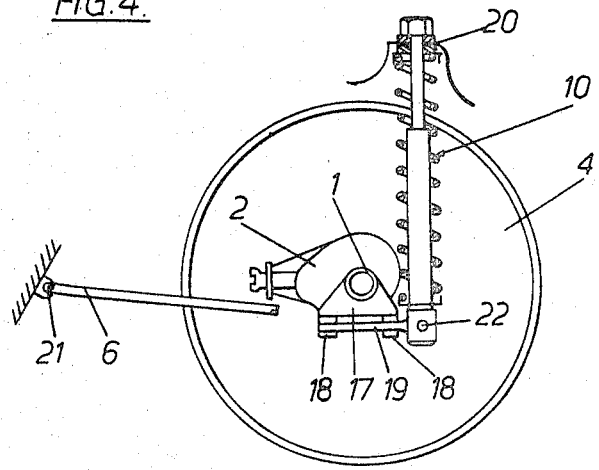
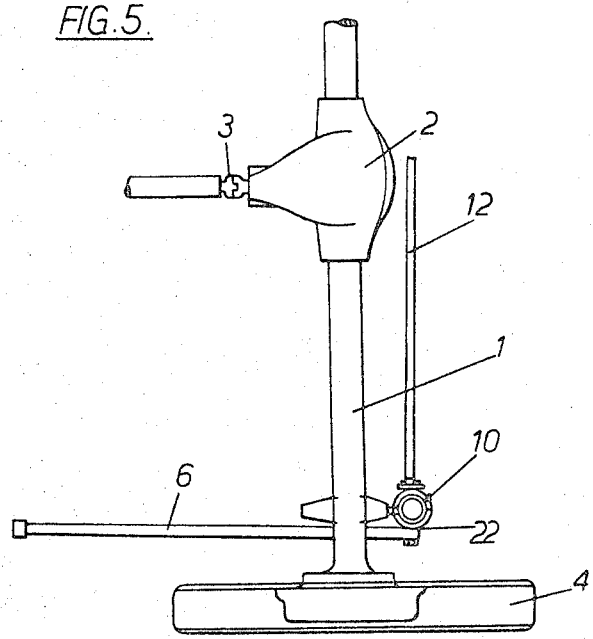

3,575,253

REAR AXLE ARRANGEMENT FOR MOTOR VEHICLES

This application is a continuation of my earlier application Ser. No. 708,192 filed Feb. 26, 1968 and since abandoned.

BACKGROUND OF THE INVENTION

The invention relates to a rear axle arrangement for motor vehicles, having a rigid driven axle which is guided at each end by but a single longitudinal link articulated to the vehicle and is resiliently connected to the vehicle body by springs.

Rear axles which are provided with longitudinal guide links tend to produce "axle hop" under the influence of braking moments and very high driving moments. Generally, axle hop occurs during forward braking and during starting in reverse, especially during braking from high speeds, whereby dangerous situations are likely.

In the rigid axle the turning moment generated by the engine produces a difference in load on the rear wheels, with the result that the more highly loaded wheel tends to lift from the road earlier than the other when braking or starting in reverse. The difference in load is the decisive condition under which power hop or brake hop takes place.

Prior proposals for obviating this axle hop, such as cushioning the axle with leaf springs, have not proved satisfactory.

The present invention takes as its starting point the aforesaid rear axle arrangement, in which the axle hop appears when the rear axle executes or attempts to execute a movement about the point of articulation of the guide link on the vehicle body, under strong braking and driving moments. The shorter the distance of the axle from the point of articulation of the guide link at the vehicle body, the more the axle is liable to driving and braking hop. Thus in the case of a simple two-link axle arrangement, the pivot axis is situated at the articulation point of the guide link on the vehicle body. With a four-link axle arrangement, the pivot axis lies at the imaginary point of intersection of both links, and, under certain load conditions, this point may approach fairly closely to the axle. For reasons of space, the guide links in a two-link axle arrangement cannot be made long enough to prevent axle hop with certainty.

SUMMARY

The present invention is concerned with the problem of shifting the pivotal axis for the rear axle so far forward or backward that, in the case of an axle having longitudinal guide links, braking and driving hop is avoided. According to the invention, this is attained by arranging that the torque exerted during starting and braking is absorbed by a supporting member which is rigidly connected with the axle and hingedly connected to the vehicle body, whilst permitting changes of spacing between axle and vehicle body.

By the use of this measure, the pivotal axis no longer lies at the point of articulation of the guide link but is situated at the imaginary point of intersection of the guide link with the imaginary line which passes through the point of articulation of the part at the vehicle body, and runs approximately parallel to the plane of the vehicle. In the unladen condition of the vehicle, the pivot axis of the axle lies far in front of the vehicle; with increasing loading this distance tends towards infinity, whereas during further spring compression the position of the pivotal axis is reversed and then lies far behind the vehicle. With the longitudinal guide link arranged behind the axle, the converse is the case.

In order to attain a simple and appropriate axle arrangement, the invention further proposes that the supporting member absorbing the torque should be formed of a spring strut consisting of a helical spring and telescopic shock absorber, whereby a springing and damping action is obtained at the same time as attaining the desired effect in a simple manner. The spring strut is rigidly connected to the axle in the longitudinal direction of the vehicle and is hingedly connected to it in the transverse direction, that is, about a pivot axis extending transversely of the rear axle. As opposed to conventional practice wherein the lower mounts of the vertical shock absorbers or other struts have been designed only for effective compression or tension load transfer, the lower mount of the spring strut herein is established over such a longitudinal span or effective distance between end points that a true rigid association is obtained between the axle and spring strut enabling application of the full axle winding force couples or torques to the strut lower end to put it into beam bending about its upper pivotal mount.

DESCRIPTION OF PREFERRED EMBODIMENTS

Further features of the invention, particularly with regard to the constructional design will be apparent from the following specification having reference to the accompanying drawings wherein:

FIG. 1 schematically illustrates, in side elevation, a suspension incorporating one embodiment of the invention;

FIG. 2 shows a front plan thereof;

FIG. 3 illustrates the connection of spring strut and axle, to a larger scale;

FIG. 4 is a side elevation of a suspension system incorporating a further embodiment of the invention, and FIG. 5 is a part plan thereof.

The rear axle is denoted by 1 and the rear axle transmission by 2. The drive shaft (not indicated in further detail) is joined to the rear axle transmission 2 via a universal joint 3. A shackle 5 is attached to each end of the axle 1 in proximity to the wheels 4, and a longitudinal link 6 is articulated to each shackle. As regards their function, it is immaterial whether the longitudinal links 6 are arranged in front of the axle 1 or behind it, although in this embodiment they are arranged in front of the axle. The disposition of the links does however influence the tendency to oversteer or understeer. Cushioning of the axle 1 is ensured through helical springs 8. The shock absorbers are designated by 9. The helical spring 8 and the telescopic shock absorber 9 are combined to form a spring strut 10 which is arranged substantially vertically. A fluid spring with level regulation could alternatively be employed. The spring strut 10 is pivotally mounted in conventional manner to the vehicle body at point 11 allowing for at least limited pivoting on both longitudinal and transverse axes of the vehicle. A Panhard rod 12 serves to take up lateral forces.

The spring strut 10 is rigidly connected with axle 1 in the longitudinal direction of the vehicle. According to FIGS. 1 to 3, this is effected by mounting pins 13 on the support tube of axle 1, for example by a screw attachment. The spring strut 10 carries a bow-shaped member 14 and its two ends have bearing holes 15 (FIG. 3) which receive the pins 13. The bow-shaped member 14 directly over the axle and partially embracing it conserves space yet the substantial spacing or longitudinal span of its ends over the pins 13 provide longitudinal rigidity necessary for transfer of high torque loads from the axle. The bearing 15 may be of metallic construction but may also be of rubber or plastic, to reduce transmission of noise or vibration. The line of additional guidance afforded by the invention, is indicated by reference 16 in FIG. 1.

In FIGS. 4 and 5, the same reference numerals are employed in so far as the parts agree with those of FIG. 1. In this construction, shackles 17 are mounted on the rear axle 1, and are each provided with bearing holes 18. Extending through these holes is a pin 19 which lies approximately at right angles to the spring strut 10 and is rigidly connected thereto. In or near the point of connection of pin 19 with the spring strut 10, the link 6 is articulated at a pivot 22. The spring strut 10 is joined to the vehicle body at point 20 and the guide link 6 at point 21. The location of the spring strut 10 behind the axle 1, as shown in FIG. 4, is of greater advantage for the invention, because it ensures a greater base of support for the axial moment.

It is of course apparent that the longitudinal span of the rigid connection of the spring strut at the axle need not be across the axis of the latter, but may be located wholly forward or rearward thereof and still connect the axle housing and spring strut as one rigid body in the longitudinal direction. It is also apparent that the rearward ends of the trailing links may be optionally pivoted to the axle at points other than the lower spring strut mounts as shown, with no effect on the improvement of the invention.

A supporting member independent of the spring and damper arrangement could additionally be used, with the change in spacing between the axle and vehicle body caused by the supporting member being accommodated by making the supporting member telescopic or by including a displaceable bearing arrangement between its upper end and the vehicle superstructure.

Having thus described the invention, what is claimed is:

I claim:

1. A suspension system for driving wheels of a motor including a rigid live rear axle guided during oscillation solely by a single link and spring strut arrangement located adjacent each wheel, said link extending longitudinally of the vehicle and having one end thereof pivotally connected to the motor vehicle and the other end thereof connected to the rear axle for relative pivoting therebetween about an axis transverse the motor vehicle, said spring strut extending generally vertically between the motor vehicle and said rear axle and being a radially rigid member, means pivotally connecting one end of the spring strut to the motor vehicle, and means hingedly connecting the other end of the spring strut to the rear axle along a pivot axis extending transversely to the rear axle and forming a rigid connection longitudinally of the vehicle, said rigid connection being established between the rear axle and said other end of the spring strut through at least two connecting points spaced substantially from each other generally along said hinge pivot axis sufficiently to enable the application to said other end of the spring strut of the reaction force couples acting on the rear axle during braking and acceleration of the motor vehicle, said reaction force couples thereby being borne by the spring strut in a bending mode about said one pivotally connected end thereof.

2. The suspension system of claim 1 wherein said connecting means comprises a bifurcated shackle fixed to said other end of the spring strut, the spaced legs of said bifurcated shackle being connected to pin means fixed to said rear axle and defining said hinge pivot axis.

3. A suspension system for driving wheels of a motor including a rigid live rear axle guided during oscillation solely by a single link and spring strut arrangement located adjacent each wheel, said link extending longitudinally of the vehicle and having one end thereof pivotally connected to the motor vehicle and the other end thereof connected to the rear axle for relative pivoting therebetween about an axis transverse the motor vehicle, said spring strut extending generally vertically between the motor vehicle and said rear axle and being a radially rigid member, means pivotally connecting one end of the spring strut to the motor vehicle, and means hingedly connecting the other end of the spring strut to the rear axle along a pivot axis extending transversely to the rear axle and forming a rigid connection longitudinally of the vehicle, said connecting means comprising a bifurcated shackle fixed to said lower end of the spring strut and overlying and partially embracing said rear axle, the legs of said shackle receiving pins extending fore and aft of the rear axle from fixed connection thereto along said hinge pivot axis thereby defining at least two connecting points spaced substantially from each other generally along said hinge pivot axis sufficiently to enable the application to said other end of the spring strut of the reaction force couples acting on the rear axle during braking and acceleration of the motor vehicle, said reaction force couples thereby being borne by the spring strut in a bending mode about said one pivotally connected end thereof.

4. In a suspension system for driven wheels of a motor vehicle which are rotatably mounted on a rigid live rear axle, the improvement which comprises a spring strut that is articulated at one end to the vehicle and at its other end is hingedly connected to the rear axle by a hinge connection having a pivot axis which extends transversely to the rear axle and is located below the level of the centerline of the axle, such that the hinge connection permits pivoting of the strut relatively to the rear axle in a transverse plane of the vehicle but forms a rigid connection between the strut and axle in the longitudinal direction of the vehicle, said hinge connection including a pin which extends between the extremities of a bifurcated shackle with the centerline of the pin forming the pivot axis of the hinge connection, and a pair of longitudinal links serving as further guiding means for the rear axle and articulated at one end to the vehicle and at the other end to each spring strut at the point of connection between the spring strut and the pin.

5. The improvement of claim 4 wherein said bifurcated shackle is fixed to the rear axle and said pin is fixed at said other end of said spring strut and is pivotally received in the spaced legs of said shackle along said pivot axis.